(12) United States Patent
Ikuma et al.

(10) Patent No.: US 9,822,241 B2
(45) Date of Patent: Nov. 21, 2017

(54) MOLDED BODY AND METHOD FOR PRODUCING CELLULOSE-NANOFIBER-CONTAINING COMPOSITION

(71) Applicant: DIC Corporation, Tokyo (JP)

(72) Inventors: Takahito Ikuma, Sakura (JP); Tetsuya Harada, Sakura (JP); Mitsuyuki Kanzaki, Takaishi (JP)

(73) Assignees: DIC Corporation, Tokyo (JP); NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 15/025,917

(22) PCT Filed: May 20, 2014

(86) PCT No.: PCT/JP2014/063303
§ 371 (c)(1),
(2) Date: Mar. 30, 2016

(87) PCT Pub. No.: WO2015/049893
PCT Pub. Date: Apr. 9, 2015

(65) Prior Publication Data
US 2016/0244597 A1 Aug. 25, 2016

(30) Foreign Application Priority Data
Oct. 2, 2013 (JP) ................... 2013-207475

(51) Int. Cl.
| | | |
|---|---|---|
| *C08J 5/06* | (2006.01) | |
| *C08K 7/02* | (2006.01) | |
| *C08L 1/08* | (2006.01) | |
| *C08J 3/20* | (2006.01) | |
| *C08F 251/02* | (2006.01) | |
| *C08F 299/06* | (2006.01) | |
| *C08L 1/02* | (2006.01) | |
| *C08F 220/34* | (2006.01) | |

(52) U.S. Cl.
CPC .............. *C08K 7/02* (2013.01); *C08F 251/02* (2013.01); *C08F 299/06* (2013.01); *C08L 1/02* (2013.01); *C08F 2220/343* (2013.01); *C08L 2205/16* (2013.01)

(58) Field of Classification Search
CPC ...... C08K 7/02; C08J 5/06; C08J 3/20; C08L 1/08
USPC ........................................................ 524/35
See application file for complete search history.

(56) References Cited

U.S. PATENT DOCUMENTS

| | | |
|---|---|---|
| 2013/0025920 A1 | 1/2013 | Shimizu et al. |
| 2013/0289170 A1 | 10/2013 | Takizawa et al. |
| 2014/0073776 A1 | 3/2014 | Shiramizu et al. |

FOREIGN PATENT DOCUMENTS

| | | |
|---|---|---|
| JP | 2005-042283 A | 2/2005 |
| JP | 2009-261993 A | 11/2009 |
| JP | 2013-116928 A | 6/2013 |
| WO | WO-2012/043558 A1 | 4/2012 |

OTHER PUBLICATIONS

Noboru Nishioka et al., Thermal Decomposition of Cellulos/Synthetic Polymer Blends Containing Grafted Products IV. Cellulose/Poly(2-hydroxyethyl methacrylate) Blends, Polymer Journal, vol. 31, No. 12, pp. 1218-1223.*
International Search Report dated Aug. 26, 2014, issued for PCT/JP2014/063303.

* cited by examiner

*Primary Examiner* — Deve E Valdez
(74) *Attorney, Agent, or Firm* — Locke Lord LLP

(57) ABSTRACT

Provided herein is a cellulose nanofiber that can be easily combined with a compound having a reactive double-bond group and that can provide a molded article which contains only a small amount of an uncured material that acts as a plasticizer in a molded product, using a simple producing method that does not require any process involving solvent displacement or solvent removal. A high-strength resin composition or molded body prepared by using the cellulose nanofiber is also provided. In refining cellulose in the presence of a compound having a reactive double bond and a hydroxyl value of 200 KOHmg/g or more, the cellulose has a moisture content of 4 to 25 parts by mass with respect to 100 parts by mass of the amount of the cellulose converted on the assumption that the percentage moisture of the cellulose is 0%.

16 Claims, No Drawings

MOLDED BODY AND METHOD FOR PRODUCING CELLULOSE-NANOFIBER-CONTAINING COMPOSITION

CROSS REFERENCE TO RELATED APPLICATIONS

This application is related to co-pending application: "MOLDED BODY AND METHOD FOR PRODUCING CELLULOSE-NANOFIBER-CONTAINING COMPOSITION" filed even date herewith in the names of Takahito IKUMA,Tetsuya HARADA and Mitsuyuki KANZAKI as a national phase entry of PCT/JP2014/063304 filed May 20, 2014, which application is assigned to the assignee of the present application and is incorporated by reference herein.

TECHNICAL FIELD

The present invention relates to a method for producing a cellulose nanofiber-containing composition as a high-function filler that can be combined with compounds having a reactive double-bond group, and to molded bodies.

BACKGROUND ART

The recently developed cellulose nanofibers are plant-derived native nanofillers, and have attracted interest as a low-specific-gravity and high-strength composite material for resins (see PTL 1).

However, at the current level of technology, cellulose, with large numbers of hydroxyl groups, needs to be defibrated in water in order to be reduced to nano-level sizes. In order to use such water-defibrated cellulose nanofibers as a composite with various resins, it is necessary to subject the product cellulose nanofibers to dehydration and solvent displacement. Further, because of its propensity to form intermolecular hydrogen bonds, cellulose tends to reaggregate during a cellulose nanofiber dehydration process, and becomes poorly dispersed in resin.

As a solution to these problems, a technique is reported that produces cellulose nanofibers by refining cellulose in an organic solvent, instead of in water (see PTL 2). Though this technique is alleged to reduce the drying cost by not using water, combining the cellulose nanofibers with resin requires dispersing cellulose in an organic solvent, and removing the organic solvent after the cellulose is reduced to nano fibrils. The technique thus still involves complicated procedures for nanofiber production.

In other words, there is a need to establish a technique with which cellulose nanofibers can be combined with various resins at lower costs and with simpler procedures.

A technique is reported that produces cellulose nanofibers by refining cellulose in resin, without using a solvent (see PTL 3). This technique greatly reduces the difficulties in combining cellulose nanofibers with resin. However, the polyester resins used in PTL 3, and the acrylic resins used in PTL 4 are not reactive in curing of a resin having a reactive double-bond group. These resins thus remain as uncured material in a molded body, and act as a plasticizer to deteriorate the quality of the molded body.

CITATION LIST

Patent Literature

[PTL 1] JP-A-2005-42283
[PTL 2] JP-A-2009-261993
[PTL 3] WO2012/043558
[PTL 4] JP-A-2013-116928

SUMMARY OF INVENTION

Technical Problem

It is an object of the present invention to provide a cellulose nanofiber that can be easily combined with a compound having a reactive double-bond group and can provide a molded article which contains only a small amount of an uncured material that acts as a plasticizer according to a simple producing method that does not require any process involving solvent displacement or solvent removal, and to provide a high-strength, resin composition or molded body by using the cellulose nanofiber.

Solution to Problem

After extensive studies, the present inventors found that cellulose can be refined in the presence of a compound having a reactive double-bond group and a hydroxyl value of 200 KOHmg/g or more, instead of in water or an organic solvent. It was also found that cellulose can be refined in the presence of a compound having a reactive double-bond group and a hydroxyl value of 200 KOHmg/g or more, and a compound having a reactive double bond and a hydroxyl value of 10 KOHmg/g or less. It was also found that the cellulose nanofiber-containing resin composition obtained by using such a method can be easily combined directly with other resins for dilution without requiring modification of cellulose or the like, and contains considerably a small amount of uncured material that acts as a plasticizer after the molding.

Specifically, the present invention provides a method for producing a cellulose nanofiber-containing resin composition, including refining cellulose in the presence of a compound having a reactive double bond and a hydroxyl value of 200 KOHmg/g or more, wherein the cellulose has a moisture content of 4 to 25 parts by mass with respect to 100 parts by mass of the amount of the cellulose converted on the assumption that the percentage moisture of the cellulose is 0%.

The present invention further provides a method for producing a cellulose nanofiber-containing resin composition according to the above method in which the compound having a reactive double-bond group and a hydroxyl value of 200 KOHmg/g or more is 40 parts by mass to 250 parts by mass with respect to 100 parts by mass of the amount of the cellulose converted on the assumption that the percentage moisture of the cellulose is 0%.

The present invention further provides a method for producing a cellulose nanofiber-containing resin composition, including refining cellulose, in the presence of a compound having a reactive double bond and a hydroxyl value of 10 KOHmg/g or less as well as the compound having a reactive double bond and a hydroxyl value of 200 KOHmg/g or more, to thereby produce a cellulose nanofiber-containing composition, wherein the cellulose has a moisture content of 4 to 25 parts by mass with respect to 100 parts by mass of the amount of the cellulose converted on the assumption that the percentage moisture of the cellulose is 0%.

The present invention further provides a method for producing a cellulose nanofiber-containing resin composition as described in claim 3, in which the compound having a reactive double-bond group and a hydroxyl value of 200

KOHmg/g or more is 10 parts by mass or more and the total amount of the compound having a reactive double-bond group and a hydroxyl value of 200 KOHmg/g or more and the compound having a reactive double bond and a hydroxyl value of 10 KOHmg/g or less is 40 parts by mass to 250 parts by mass, with respect to 100 parts by mass of the amount of the cellulose converted on the assumption that the percentage moisture of the cellulose is 0%.

The present invention further provides a method for producing a cellulose nanofiber-containing resin composition, which further includes diluting the cellulose nanofiber-containing resin composition with a compound having a reactive double-bond group.

The present invention further provides a method for producing a cellulose nanofiber-containing resin composition, which further includes incorporating a polymerization initiator.

The present invention further provides a molded body of the cellulose nanofiber-containing resin composition produced according to the foregoing methods.

Advantageous Effects of Invention

The present invention enables refining cellulose in the presence of a compound having a reactive double-bond group and a hydroxyl value of 200 KOHmg/g or more, instead of in water or organic solvent. A cellulose nanofiber-containing resin composition obtained by using such a method can easily be directly combined with other diluent resins, without requiring procedures such as solvent displacement, and removal of organic solvent. This makes it possible to easily obtain a desirable cellulose nanofiber composite resin composition. The resin composition can directly be used to produce a molded body. Because the compound having a reactive double-bond group and a hydroxyl value of 200 KOHmg/g or more does not become an uncured material that acts as a plasticizer during the curing, the quality of the product molded body does not deteriorate, and the molded body can have high strength with the effect of the cellulose nanofiber.

The present invention also enables refining cellulose in the presence of a compound having a reactive double bond and a hydroxyl value of 200 KOHmg/g or more, and a compound having a reactive double bond and a hydroxyl value of 10 KOHmg/g or less. By using a compound having a reactive double bond and a hydroxyl value of 10 KOHmg/g or less in combination, the compound having a reactive double bond and a hydroxyl value of 200 KOHmg/g or more, which is hydrophilic, can be used in a smaller amount. The resulting composition is also usable in applications where moisture absorption needs to be avoided.

DESCRIPTION OF EMBODIMENTS

An embodiment of the present invention is described below in detail. Note that the descriptions of the embodiment of the present invention below are intended to be illustrative, and do not limit the invention.

[Types of Cellulose]

The cellulose nanofiber of the present invention is obtained by refining various types of cellulose. The cellulose used in the present invention may be any cellulose that can be used as a refinement material, including, for example, pulp, cotton, paper, and regenerated cellulose fibers such as rayon, cupra, polynosic, and acetate. Other examples thereof include bacterial cellulose, and cellulose derived from animals such as ascidians.

The cellulose may be one that has been chemically modified on the surface, as required.

Both wood pulp and nonwood pulp may preferably be used as pulp. Of mechanical pulps and chemical pulps, chemical pulps with smaller lignin contents are more preferred for use as wood pulp. A variety of chemical pulp, including sulfide pulp, kraft pulp, and alkali pulp may preferably used. A variety of nonwood pulp may be used, including straw, bagasse, kenaf, bamboo, reed, kozo (*B. papyrifera*), and flax.

Cotton is a plant extensively used to make clothing fibers, and any of raw cotton, a cotton fiber, and a cotton fabric may be used.

Paper is produced by separating and straining fibers from pulp. Used paper, such as newspaper, used milk cartons, and printed paper also may preferably be used.

The cellulose used as a refinement material may be a cellulose powder produced by disrupting cellulose into a certain particle size distribution. Examples of such products include KC Flock® (manufactured by Nippon Paper Chemicals Co., Ltd.), Ceolus® (manufactured by Asahi Kasei Chemicals Corporation), and Avicel® (manufactured by FMC).

[Refinement of Cellulose in the Presence of Compound Having Reactive Double-Bond Group and Hydroxyl Value of 200 KOHmg/g or More]

Cellulose may be refined by mixing cellulose with a compound having a reactive double-bond group and a hydroxyl value of 200 KOHmg/g or more, and mechanically applying a shear force to the mixture. A shear force may be applied by means of, for example, an extruder (such as a bead mill, an ultrasonic homogenizer, a uniaxial extruder, and a biaxial extruder), a Banbury mixer, a grinder, or a pressure kneader. A shear force also may be applied using, for example, a known kneader, such as with two rollers. From the viewpoint of obtaining a stable shear force also for high-viscosity resins, it is preferable to use a pressure kneader.

In the present invention, cellulose and the compound having a reactive double-bond group and a hydroxyl value of 200 KOHmg/g or more are mixed in such proportions that the compound having a reactive double-bond group and a hydroxyl value of 200 KOHmg/g or more is preferably 40 parts by mass to 250 parts by mass with respect to 100 parts by mass of the amount of the cellulose converted on the assumption that the percentage moisture of the cellulose is 0%. Increasing the content of the compound having a reactive double-bond group and a hydroxyl value of 200 KOHmg/g or more makes the sample slurry, and the sample fails to defibrate. When the content of the compound having a reactive double-bond group and a hydroxyl value of 200 KOHmg/g or more is small, the cellulose does not wet, and defibration does not proceed.

In the present invention, the moisture content is preferably 4 to 25 parts by mass with respect to 100 parts by mass of cellulose the amount of the cellulose converted on the assumption that the percentage moisture of the cellulose is 0%. As used herein, "moisture content" is inclusive of the original moisture content of the cellulose. When the moisture content is less than 4 parts by mass, the cellulose aggregates and hardens, and fails to defibrate. When it is above 25 parts by mass, the cellulose is unable to absorb all moisture, and the sample fails to defibrate as it becomes slurry.

[Measurement Method of the Mass of the Cellulose Converted on the Assumption that the Percentage Moisture of the Cellulose is 0%]

For moisture content measurement, about 5 g of cellulose is heated at 110° C. using the infrared moisture meter FD-720 (Kett Electric Laboratory) under the conditions of an automatic shutoff mode. Here, when the moisture content is 5%, the mass of the cellulose on the assumption that the percentage moisture of the cellulose is 0% is 95 parts by mass, with respect to 100 parts by mass of the cellulose. In the following, measurements for the mass of the cellulose converted on the assumption that the percentage moisture of the cellulose is 0% are performed according to the above method.

[Compound Having Reactive Double-Bond Group and Hydroxyl Value of 200 KOHmg/g or More]

As used herein, "compound having a reactive double-bond group and a hydroxyl value of 200 KOHmg/g or more" refers to compounds having one or more reactive double-bond groups and a hydroxyl value of 200 KOHmg/g or more. Reactive double-bond group refers to double bond groups that are polymerizable through polymerization reactions such as anionic polymerization, cationic polymerization, and radical polymerization. Examples of such reactive double-bond groups include a vinyl group, an acryl group, and a methacryl group.

Examples of the compound having a reactive double-bond group and a hydroxyl value of 200 KOHmg/g or more include 2-hydroxyethyl (meth)acrylate, 2-hydroxypropyl (meth)acrylate, 3-hydroxypropyl (meth)acrylate, 4-hydroxybutyl (meth)acrylate, 3-phenoxy-2-hydroxypropyl (meth)acrylate, glyceryl monomethacrylate, and glyceryl dimethacrylate.

The compound having a reactive double-bond group and a hydroxyl value of 200 KOHmg/g or more may be used alone or in a combination of two or more.

In the present invention, it is preferable to add a polymerization inhibitor in order that the compound having a reactive double-bond group and a hydroxyl value of 200 KOHmg/g or more does not polymerize during defibration. The polymerization inhibitor is not particularly limited, and may be, for example, methoquinone, hydroquinone, t-butyl hydroquinone, or 4-t-butyl catechol.

The refining method of the present invention reduces cellulose into cellulose nanofibers. The refining method of the present invention enables refining cellulose into, for example, a length of 100 nm to 1,000,000 nm along the long axis direction, and a length of 5 nm to 1,000 nm along the short axis direction.

[Refinement of Cellulose in the Presence of Compound Having Reactive Double Bond and Hydroxyl Value of 200 KOHmg/g or More, and Compound Having Reactive Double Bond and Hydroxyl Value of 10 KOHmg/g or Less]

Cellulose may be refined by mixing cellulose with a compound having a reactive double-bond group and a hydroxyl value of 200 KOHmg/g or more, and a compound having a reactive double bond and a hydroxyl value of 10 KOHmg/g or less, and mechanically applying a shear force to the mixture. A shear force may be applied by means of, for example, an extruder (such as a bead mill, an ultrasonic homogenizer, a uniaxial extruder, and a biaxial extruder), a Banbury mixer, a grinder, or a pressure kneader. A shear force also may be applied using, for example, a known kneader, such as with two rollers. From the viewpoint of obtaining a stable shear force also for high-viscosity resins, it is preferable to use a pressure kneader.

In the present invention, it is preferable that the compound having a reactive double-bond group and a hydroxyl value of 200 KOHmg/g or more is 10 parts by mass or more with respect to 100 parts by mass of the amount of the cellulose converted on the assumption that the percentage moisture of the cellulose is 0%. With 10 parts by mass or more of the compound having a reactive double-bond group and a hydroxyl value of 200 KOHmg/g or more, the wettability for the compound having a reactive double bond and a hydroxyl value of 10 KOHmg/g or less, and for the cellulose improves, and helps promote the refinement of the cellulose.

In the present invention, the compound having a reactive double-bond group and a hydroxyl value of 200 KOHmg/g or more, and the compound having a reactive double bond and a hydroxyl value of 10 KOHmg/g or less are mixed with cellulose in such proportions that the total content of the compound having a reactive double-bond group and a hydroxyl value of 200 KOHmg/g or more, and the compound having a reactive double bond and a hydroxyl value of 10 KOHmg/g or less is preferably 40 parts by mass to 250 parts by mass with respect to 100 parts by mass of the amount of the cellulose converted on the assumption that the percentage moisture of the cellulose is 0%. Increasing the contents of the compound having a reactive double-bond group and a hydroxyl value of 200 KOHmg/g or more, and the compound having a reactive double bond and a hydroxyl value of 10 KOHmg/g or less makes the sample slurry, and the sample fails to defibrate. When the contents of the compound having a reactive double-bond group and a hydroxyl value of 200 KOHmg/g or more, and the compound having a reactive double bond and a hydroxyl value of 10 KOHmg/g or less are small, the cellulose does not wet, and defibration does not proceed.

In the present invention, it is preferable that the moisture content is 4 to 25 parts by mass with respect to 100 parts by mass of the amount of the cellulose converted on the assumption that the percentage moisture of the cellulose is 0%. As used herein, "moisture content" is inclusive of the original moisture content of the cellulose. With a moisture content of less than 4 parts by mass, the cellulose aggregates and hardens, and fails to defibrate. Above 25 parts by mass, the cellulose is unable to absorb all moisture, and the compound having a reactive double bond and a hydroxyl value of 10 KOHmg/g or less fails to defibrate as it emulsifies.

[Compound Having Reactive Double-Bond Group and Hydroxyl Value of 200 KOHmg/g or More]

As used herein, "compound having a reactive double-bond group and a hydroxyl value of 200 KOHmg/g or more" refers to compounds having one or more reactive double-bond groups, and a hydroxyl value of 200 KOHmg/g or more. Reactive double-bond group refers to double bond groups that are polymerizable through polymerization reactions such as anionic polymerization, cationic polymerization, and radical polymerization. Examples of such reactive double-bond groups include a vinyl group, an acryl group, and a methacryl group.

Examples of the compound having a reactive double-bond group and a hydroxyl value of 200 KOHmg/g or more include 2-hydroxyethyl (meth)acrylate, 2-hydroxypropyl (meth)acrylate, 3-hydroxypropyl (meth)acrylate, 4-hydroxybutyl (meth)acrylate, 3-phenoxy-2-hydroxypropyl (meth)acrylate, glyceryl monomethacrylate, and glyceryl dimethacrylate.

The compound having a reactive double-bond group and a hydroxyl value of 200 KOHmg/g or more may be used alone or in a combination of two or more.

[Compound Having Reactive Double-Bond Group and Hydroxyl Value of 10 KOHmg/g or Less]

As used herein, "compound having a reactive double-bond group and a hydroxyl value of 10 KOHmg/g or less" refers to compounds having one or more reactive double-bond groups and a hydroxyl value of 10 KOHmg/g or less. Reactive double-bond group refers to double bond groups that are polymerizable through polymerization reactions such as anionic polymerization, cationic polymerization, and radical polymerization. Examples of such reactive double-bond groups include a vinyl group, an acryl group, and a methacryl group.

The compound having a reactive double-bond group and a hydroxyl value of 10 KOHmg/g or less may be a low-molecular to high-molecular resin. Examples thereof include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, n-hexyl (meth)acrylate, cyclohexyl (meth)acrylate, t-butylcyclohexyl (meth)acrylate, 2-ethylhexyl (meth)acrylate, t-octyl (meth)acrylate, dodecyl (meth)acrylate, octadecyl (meth)acrylate, acetoxyethyl (meth)acrylate, phenyl (meth)acrylate, 2-methoxyethyl (meth)acrylate, 2-ethoxyethyl (meth)acrylate, 2-(2-methoxyethoxy)ethyl (meth)acrylate, 2-chloroethyl (meth)acrylate, glycidyl (meth)acrylate, 3,4-epoxycyclohexylmethyl (meth)acrylate, vinyl (meth)acrylate, 2-phenylvinyl (meth)acrylate, 1-propenyl (meth)acrylate, allyl (meth)acrylate, 2-allyloxyethyl (meth)acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, polyethylene glycol monomethyl ether (meth)acrylate, polyethylene glycol monoethyl ether (meth)acrylate, β-phenoxyethoxyethyl (meth)acrylate, nonylphenoxypolyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate, γ-butyrolactone (meth)acrylate, trimethylolpropane trimethacrylate, polyethylene glycol dimethacrylate, polypropylene glycol dimethacrylate, polytetramethylene glycol dimethacrylate, ditrimethylolpropane tetraacrylate, dipentaerythritol pentaacrylate and hexaacrylate, phenol EO-modified acrylate, trimethylolpropane EO-modified triacrylate, trimethylolpropane PO-modified triacrylate, bisphenol F EO-modified (n≈2) diacrylate, bisphenol F PO-modified (n≈2) diacrylate, pentaerythritol triacrylate and tetraacrylate, ditrimethylolpropane tetraacrylate, vinyl acetate, vinyl chloroacetate, vinyl propionate, vinyl butyrate, vinyl methoxyacetate, and vinyl benzoate, dimethyl maleate, diethyl maleate, dibutyl maleate, dimethyl fumarate, diethyl fumarate, dibutyl fumarate, dimethyl itaconate, diethyl itaconate, dibutyl itaconate, (meth)acrylamide, N-methyl (meth)acrylamide, N-ethyl (meth)acrylamide, N-propyl (meth)acrylamide, N-isopropyl (meth)acrylamide, N-n-butylacryl(meth)amide, N-t-butyl (meth)acrylamide, N-cyclohexyl (meth)acrylamide, N-(2-methoxyethyl)(meth)acrylamide, N,N-dimethyl (meth)acrylamide, N,N-diethyl (meth)acrylamide, N-phenyl (meth)acrylamide, N-nitrophenylacrylamide, N-ethyl-N-phenylacrylamide, N-benzyl (meth)acrylamide, (meth)acryloylmorpholine, diacetoneacrylamide, N-methylolacrylamide, vinyl (meth)acrylamide, N,N-diallyl (meth)acrylamide, N-allyl (meth)acrylamide, styrene, methylstyrene, dimethylstyrene, trimethylstyrene, ethylstyrene, isopropylstyrene, butylstyrene, methoxystyrene, butoxystyrene, acetoxystyrene, chlorostyrene, dichlorostyrene, bromostyrene, chloromethylstyrene, α-methylstyrene, methyl vinyl ether, ethyl vinyl ether, 2-chloroethyl vinyl ether, propyl vinyl ether, butyl vinyl ether, hexyl vinyl ether, octyl vinyl ether, methoxyethyl vinyl ether, phenyl vinyl ether, methyl vinyl ketone, ethyl vinyl ketone, propyl vinyl ketone, phenyl vinyl ketone, ethylene, propylene, isobutylene, butadiene, isoprene, maleimide, butylmaleimide, cyclohexylmaleimide, phenylmaleimide, (meth)acrylonitrile, vinyl pyridine, N-vinyl pyrrolidone, vinyl carbazole, N-vinyl formamide, N-vinyl acetamide, N-vinyl imidazole, and vinyl caprolactone.

The resin having a reactive double-bond group may be obtained by introducing a reactive double-bond group to resins such as a polyester resin, an acrylic resin, and a urethane resin. The reactive double-bond group may be introduced by using any known conventional methods, and the method of introduction is not particularly limited.

For example, when introducing a reactive double-bond group to a polyester resin, a method may be used by which a polyester resin having a carboxyl group is reacted with glycidyl (meth)acrylate.

In the case of acrylic resin, a reactive double-bond group may be introduced by, for example, reacting an acrylic resin having a carboxyl group with glycidyl (meth)acrylate, or reacting an acrylic resin having a glycidyl group with (meth)acrylic acid.

In the case of urethane resin, a reactive double-bond group may be introduced by, for example, reacting a urethane resin having an isocyanate group with a compound having a hydroxyl group and a reactive double-bond group, such as 2-hydroxyethyl (meth)acrylate.

The compound having a reactive double-bond group and a hydroxyl value of 10 KOHmg/g or less may be used alone or in a combination of two or more.

In the present invention, it is preferable to add a polymerization inhibitor so that the compound having a reactive double-bond group and a hydroxyl value of 200 KOHmg/g or more, and the compound having a reactive double bond and a hydroxyl value of 10 KOHmg/g or less do not polymerize during defibration.

The polymerization inhibitor is not particularly limited, and may be, for example, methoquinone, hydroquinone, t-butylhydroquinone, or 4-t-butyl catechol.

The refining method of the present invention reduces cellulose to cellulose nanofibers. The refining method of the present invention enables refining cellulose into, for example, a length of 100 nm to 1,000,000 nm along the long axis direction, and a length of 5 nm to 1,000 nm along the short axis direction.

A resin composition suited for molding may be obtained by diluting the cellulose nanofiber-containing resin composition obtained by using the producing method, with a compound having a reactive double-bond group.

When diluting the cellulose nanofiber-containing resin composition with a compound having a reactive double-bond group, the cellulose nanofiber-containing resin composition may be used either directly or after being dried.

[Compound Having Reactive Double-Bond Group]

As used herein, "compound having a reactive double-bond group" refers to compounds having one or more reactive double-bond groups. Reactive double-bond group refers to double bond groups that are polymerizable through polymerization reactions such as anionic polymerization, cationic polymerization, and radical polymerization.

Examples of such reactive double-bond groups include a vinyl group, an acryl group, and a methacryl group.

The compound having a reactive double-bond group may be a low-molecular to high-molecular resin. Examples thereof include (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, amyl (meth)acrylate, n-hexyl (meth)acrylate, cyclohexyl (meth)acrylate, t-butylcyclohexyl (meth)acrylate, 2-ethylhexyl (meth)acrylate, t-octyl (meth)acrylate, dodecyl (meth)acrylate, octadecyl (meth)acrylate, acetoxyethyl (meth)acrylate, phenyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, 2-methoxyethyl (meth)acrylate, 2-ethoxyethyl (meth)acrylate, 2-(2-methoxyethoxy)ethyl (meth)acrylate, 3-phenoxy-2-hydroxypropyl (meth)acrylate, 2-chloroethyl (meth)acrylate, glycidyl (meth)acrylate, 3,4-epoxycyclohexylmethyl (meth)acrylate, vinyl (meth)acrylate, 2-phenylvinyl (meth)acrylate, 1-propenyl (meth)acrylate, allyl (meth)acrylate, 2-allyloxyethyl (meth)acrylate, propargyl (meth)acrylate, benzyl (meth)acrylate, diethylene glycol monomethyl ether (meth)acrylate, diethylene glycol monoethyl ether (meth)acrylate, triethylene glycol monomethyl ether (meth)acrylate, triethylene glycol monoethyl ether (meth)acrylate, polyethylene glycol monomethyl ether (meth)acrylate, polyethylene glycol monoethyl ether (meth)acrylate, β-phenoxyethoxyethyl (meth)acrylate, nonylphenoxypolyethylene glycol (meth)acrylate, dicyclopentenyl (meth)acrylate, dicyclopentenyloxyethyl (meth)acrylate, trifluoroethyl (meth)acrylate, octafluoropentyl (meth)acrylate, perfluorooctylethyl (meth)acrylate, dicyclopentanyl (meth)acrylate, tribromophenyl (meth)acrylate, tribromophenyloxyethyl (meth)acrylate, γ-butyrolactone (meth)acrylate, glyceryl monomethacrylate, glyceryl dimethacrylate, trimethylolpropane trimethacrylate, polyethylene glycol dimethacrylate, polypropylene glycol dimethacrylate, polytetramethylene glycol dimethacrylate, ditrimethylolpropane tetraacrylate, dipentaerythritol pentaacrylate and hexaacrylate, phenol EO modified acrylate, trimethylolpropane EO-modified triacrylate, trimethylolpropane PO-modified triacrylate, bisphenol F EO-modified (n≈2)diacrylate, bisphenol F PO-modified (n≈2)diacrylate, pentaerythritol triacrylate and tetraacrylate, ditrimethylolpropane tetraacrylate, vinyl acetate, vinyl chloroacetate, vinyl propionate, vinyl butyrate, vinyl methoxyacetate, and vinyl benzoate, dimethyl maleate, diethyl maleate, dibutyl maleate, dimethyl fumarate, diethyl fumarate, dibutyl fumarate, dimethyl itaconate, diethyl itaconate, dibutyl itaconate, (meth)acrylamide, N-methyl (meth)acrylamide, N-ethyl (meth)acrylamide, N-propyl (meth)acrylamide, N-isopropyl (meth)acrylamide, N-n-butylacryl(meth)amide, N-t-butyl (meth)acrylamide, N-cyclohexyl (meth)acrylamide, N-(2-methoxyethyl)(meth)acrylamide, N,N-dimethyl (meth)acrylamide, N,N-diethyl (meth)acrylamide, N-phenyl (meth)acrylamide, N-nitrophenylacrylamide, N-ethyl-N-phenylacrylamide, N-benzyl (meth)acrylamide, (meth)acryloylmorpholine, diacetoneacrylamide, N-methylolacrylamide, N-hydroxyethylacrylamide, vinyl (meth)acrylamide, N,N-diallyl (meth)acrylamide, N-allyl (meth)acrylamide, styrene, methylstyrene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethylstyrene, α-methylstyrene, methyl vinyl ether, ethyl vinyl ether, 2-chloroethyl vinyl ether, hydroxyethyl vinyl ether, propyl vinyl ether, butyl vinyl ether, hexyl vinyl ether, octyl vinyl ether, methoxyethyl vinyl ether, phenyl vinyl ether, methyl vinyl ketone, ethyl vinyl ketone, propyl vinyl ketone, phenyl vinyl ketone, ethylene, propylene, isobutylene, butadiene, isoprene, maleimide, butylmaleimide, cyclohexylmaleimide, phenylmaleimide, (meth)acrylonitrile, vinyl pyridine, N-vinyl pyrrolidone, vinyl carbazole, N-vinyl formamide, N-vinyl acetamide, N-vinyl imidazole, and vinyl caprolactone.

The resin having a reactive double-bond group may be obtained by introducing a reactive double-bond group to resins such as a polyester resin, an acrylic resin, and a urethane resin. The reactive double-bond group may be introduced by using any known conventional methods, and the method of introduction is not particularly limited.

For example, when introducing a reactive double-bond group to a polyester resin, a method may be used by which a polyester resin having a carboxyl group is reacted with glycidyl (meth)acrylate.

In the case of acrylic resin, a reactive double-bond group may be introduced by, for example, reacting an acrylic resin having a carboxyl group with glycidyl (meth)acrylate, or reacting an acrylic resin having a glycidyl group with (meth)acrylic acid.

In the case of urethane resin, a reactive double-bond group may be introduced by, for example, reacting a urethane resin having an isocyanate group with a compound having a hydroxyl group and a reactive double-bond group, such as 2-hydroxyethyl (meth)acrylate.

The compound having a reactive double-bond group may be used alone or in a combination of two or more.

The cellulose nanofiber-containing resin composition, and the compound having a reactive double-bond group may be used in any proportions, provided that it is not detrimental to the effects of the present invention.

A polymerization initiator needs to be mixed to mold the resin composition. A polymerization initiator may be mixed at any timing, such as when diluting with the compound having a reactive double-bond group, after diluting with the compound having a reactive double-bond group, and immediately before molding.

The polymerization initiator may be, for example, a photopolymerization initiator, or a heat-polymerization initiator.

The photopolymerization initiator is not particularly limited. Examples thereof include 1-hydroxycyclohexyl phenyl ketone, 2-hydroxy-2-methyl-1-phenylpropan-1-one, diethoxyacetophenone, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 2-methyl-1-[4-(methylthio)phenyl]-2-morpholinopropane-1, benzoin, benzoin methyl ether, benzoin ethyl ether, benzoin isopropyl ether, benzoin n-butyl ether, benzoin phenyl ether, benzyl dimethyl ketal, benzophenone, benzoylbenzoic acid, methylbenzoyl benzoate, 4-phenylbenzophenone, hydroxybenzophenone, acrylated benzophenone, 4-benzoyl-4'-methyldiphenylsulfide, 3,3'-dimethyl-4-methoxybenzophenone, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, methylphenylglyoxylate, benzyl, and camphorquinone.

Examples of the heat-polymerization initiator include peroxides such as isobutyl peroxide, cumyl peroxyneodecanate, diisopropyl peroxydicarbonate, di-2-ethylhexyl peroxydicarbonate, tert-butyl peroxyneodecanate, 3,5,5-trimethylhexanol peroxide, lauryl peroxide, 1,1,3,3,- tetramethylbutyl peroxy-2-ethylhexanate, t-hexylperoxy-2-ethylhexanate, benzoyl peroxide, t-butyl peroxymaleic acid, and t-butyl peroxybenzoate; and azo compounds such as azobisisobutylnitrile, azobis-2,4-dimethylvaleronitrile, and azobiscyclohexanecarbonitrile. The heat-polymerization initiator may be used alone or in a combination of two or more, or with a decomposition promoter such as cobalt naphthenate, and dimethylaniline.

[Other Additives]

The resin composition may contain various known additives for difference uses, provided that such addition is not detrimental to the effects of the present invention. Examples of additives include a hydrolysis preventing agent, a colorant, a fire retardant, an antioxidant, a polymerization inhibitor, an ultraviolet absorber, an antistatic agent, a lubricant, a release agent, a defoaming agent, a leveling agent, a light stabilizer (for example, such as hindered amine), an antioxidant, an inorganic filler, and an organic filler.

These additives may be added at any timing, such as before defibrating cellulose, after defibrating cellulose, during dilution with the compound having a reactive double-bond group, and after dilution with the compound having a reactive double-bond group, provided that it is not detrimental to the effects of the present invention.

[Molding Method]

The method for molding a molded body according to the resin composition of the present invention is not particularly limited. It is, however, preferable to use a method that flows the material into a mold made of materials such as FRP, resin, and glass, or a method that applies the material using a brush, a roller, a trowel, a spray, or the like.

[Use]

The resin composition of the present invention may preferably be used in a range of applications. For example, the present invention is applicable to floor materials, waterproofing materials, and road pavers in applications such as waterproofing of floors, roofs, rooftops, and walls in offices, factories, and clean rooms, waterproofing of floorboards for viaducts, and coloring, heat-shield coating, and antiskid paving of asphalt and concrete road surfaces. The invention, however, is not limited to these applications.

EXAMPLES

A form of the present invention is described below in detail. It should be noted, however, that the present invention is not limited by the following.

Synthesis Example 1

Synthesis of PPG Urethane Methacrylate Resin 496 g of polypropylene glycol (hereinafter, simply "PPG") having a number average molecular weight of 1,000, 145 g of tolylene diisocyanate, and 33 g of isophorone diisocyanate were charged into a 1-liter four-neck flask equipped with a thermometer, an agitator, an inert gas inlet, an air inlet, and a reflux condenser, and reacted at 80° C. for 4 h under a nitrogen stream. As the NCO equivalent reached 600, a value nearly equal to the theoretical equivalent, the mixture was cooled to 50° C. After adding 0.07 g of hydroquinone and 134 g of 2-hydroxyethylmethacrylate (hereinafter, simply "HEMA"), the mixture was reacted at 90 degrees for 5 h under a stream of air. At the time when the NCO % reached 0.1% or less, 0.07 g of tert-Butyl catechol was added, and thus, a composition 1 of a urethane methacrylate resin having a number average molecular weight of 1,666 was obtained. The hydroxyl value of the resin composition was measured, and was less than 1 KOHmg/g.

[Hydroxyl Value Measurement]

Terminal hydroxyl value and acid value were determined from the area ratio of peaks derived from the terminal structure and the ester bond in a 13C-NMR spectrum. By using the JEOL product JNM-LA300, 10 mg of a relaxation reagent Cr (acac) 3 was added to 10 mass % of a sample deuterated-chloroform solution, and 13C-NMR quantitative measurements were performed using the gated coupling method. The measurement was run 4,000 times.

Example 1

Cellulose Refining Method 400 g of HEMA and 0.2 g of tert-butyl catechol were mixed, and charged into a pressure kneader (DS1-5GHH-H manufactured by Moriyama Corporation). After adding 625 g of the cellulose powder product KC Flock® W-50GK (manufactured by Nippon Paper Industries Co., Ltd.) thereto, the mixture was kneaded under pressure at 60 rpm for 300 min. The above cellulose refining process produced a cellulose nanofiber-containing resin composition 1. The cellulose used had a moisture content of 4.2 parts by mass with respect to 100 parts by mass of the amount of the cellulose converted on the assumption that the percentage moisture of the cellulose is 0%. HEMA had a hydroxyl value of 431 KOHmg/g as measured by using the hydroxyl value measurement method described in Synthesis Example 1.

[Determination of Refined State]

The cellulose nanofiber-containing composition 1 was suspended in acetone to make the cellulose concentration 0.5 mass %, and dispersed at 15,000 rpm for 20 min using TK homomixer A (manufactured by Tokushu Kikai Kogyo Co., Ltd.). After spreading a droplet of the suspension over glass and drying acetone, the sample was micrographed 10 times in 10,000 times magnification using a scanning electron microscope. A straight line was diagonally drawn on each picture, and the fiber diameter of cellulose fibers that crossed the straight line was measured. The same measurement was performed for all 10 micrographs, and the number average fiber diameter was measured. The refined state of cellulose was determined as "Good" when the number average fiber diameter was less than 500 nm, "Acceptable" when the number average fiber diameter was 500 nm or more and less than 1,000 nm, and "Poor" when the number average fiber diameter was 1,000 nm or more. The same determination was made in Examples 2 to 10 and Comparative Examples 1 to 8.

[Percentage Moisture Measurement of Cellulose]

About 5 g of cellulose was measured at 110° C. with the Infrared Moisture Meter FD-720 (Kett Electric Laboratory) under the conditions of an automatic shutoff mode.

The same measurement was performed in Examples 2 to 10 and Comparative Examples 1 to 8.

Example 2

Cellulose Refining Method 700 g of HEMA and 0.4 g of tert-butyl catechol were mixed, and charged into a pressure kneader (DS1-5GHH-H manufactured by Moriyama Corporation). After adding 317 g of the cellulose powder product KC Flock® W-50GK (manufactured by Nippon Paper Industries Co., Ltd.)

thereto, the mixture was kneaded under pressure at 60 rpm for 300 min. The cellulose refining process produced a cellulose nanofiber-containing resin composition 2. The cellulose used had a moisture content of 5.5 parts by mass with respect to 100 parts by mass of the amount of the cellulose converted on the assumption that the percentage moisture of the cellulose is 0%.

Example 3

Cellulose Refining Method 400 g of HEMA and 0.2 g of tert-butyl catechol were mixed, and charged into a pressure kneader (DS1-5GHH-H manufactured by Moriyama Corporation). The kneader was then charged with 627 g of the cellulose powder product KC Flock® W-50GK (manufactured by Nippon Paper Industries Co., Ltd.). The cellulose used had a moisture content of 4.5 parts by mass with respect to 100 parts by mass of the amount of the cellulose converted on the assumption that the percentage moisture of the cellulose is 0%. After adding 123 g of water to make the moisture content 25.0 parts by mass with respect to 100 parts by mass of the amount of the cellulose converted on the assumption that the percentage moisture of the cellulose is 0%, the mixture was kneaded under pressure at 60 rpm for 60 min. Here, the sample was powdery with moisture. The sample was further kneaded under pressure at 60 rpm for 240 min. The cellulose refining process produced a cellulose nanofiber-containing resin composition 3.

Example 4

Cellulose Refining Method 300 g of Glyceryl dimethacrylate and 0.2 g of tert-butyl catechol were mixed, and charged into a pressure kneader (DS1-5GHH-H manufactured by Moriyama Corporation). After adding 734 g of the cellulose powder product KC Flock® W-50GK (manufactured by Nippon Paper Industries Co., Ltd.) thereto, the mixture was kneaded under pressure at 60 rpm for 300 min. The cellulose refining process produced a cellulose nanofiber-containing resin composition 4. The cellulose used had a moisture content of 4.8 parts by mass with respect to 100 parts by mass of the amount of the cellulose converted on the assumption that the percentage moisture of the cellulose is 0%. The glyceryl dimethacrylate had a hydroxyl value of 246 KOHmg/g as measured by using the hydroxyl value measurement method described in Synthesis Example 1.

Comparative Example 1

Cellulose Refining Method 250 g of HEMA and 0.2 g of tert-butyl catechol were mixed, and charged into a pressure kneader (DS1-5GHH-H manufactured by Moriyama Corporation). After adding 632 g of the cellulose powder product KC Flock® W-50GK (manufactured by Nippon Paper Industries Co., Ltd.) thereto, the mixture was kneaded under pressure at 60 rpm for 300 min. This completed the cellulose refining process. The cellulose used had a moisture content of 5.4 parts by mass with respect to 100 parts by mass of the amount of the cellulose converted on the assumption that the percentage moisture of the cellulose is 0%.

Comparative Example 2

Cellulose Refining Method 750 g of HEMA and 0.4 g of tert-butyl catechol were mixed, and charged into a pressure kneader (DS1-5GHH-H manufactured by Moriyama Corporation). After adding 263 g of the cellulose powder product KC Flock® W-50GK (manufactured by Nippon Paper Industries Co., Ltd.) thereto, the mixture was kneaded under pressure at 60 rpm for 300 min, thereby completing the cellulose refining process. The cellulose used had a moisture content of 5.0 parts by mass with respect to 100 parts by mass of the amount of the cellulose converted on the assumption that the percentage moisture of the cellulose is 0%.

Comparative Example 3

Cellulose Refining Method

The cellulose powder product KC Flock® W-50GK (manufactured by Nippon Paper Industries Co., Ltd.) was dried overnight with a 130° C. drier. The cellulose had a moisture content of 3.1 parts by mass with respect to 100 parts by mass of the amount of the cellulose converted on the assumption that the percentage moisture of the cellulose is 0%. 400 g of HEMA and 0.2 g of tert-butyl catechol were mixed with each other, and charged into a pressure kneader (DS1-5GHH-H manufactured by Moriyama Corporation). After adding 619 g of the dried KC Flock® W-50GK thereto, the mixture was kneaded under pressure at 60 rpm for 300 min, thereby completing the cellulose refining process.

Comparative Example 4

Cellulose Refining Method 400 g of HEMA and 0.2 g of tert-butyl catechol were mixed with each other, and charged into a pressure kneader (DS1-5GHH-H manufactured by Moriyama Corporation). The kneader was then charged with 631 g of the cellulose powder product KC Flock® W-50GK (manufactured by Nippon Paper Industries Co., Ltd.). The cellulose used had a moisture content of 5.1 parts by mass with respect to 100 parts by mass of the amount of the cellulose converted on the assumption that the percentage moisture of the cellulose is 0%. After adding 149 g of water to make the moisture content 30.0 parts by mass with respect to 100 parts by mass of the amount of the cellulose converted on the assumption that the percentage moisture of the cellulose is 0%, the mixture was kneaded under pressure at 60 rpm for 300 min.

Table 1 shows the results of the determination of refined state for the cellulose samples of Examples 1 to 4 and Comparative Examples 1 to 4.

TABLE 1

| | | Ex. 1 | Ex. 2 | Ex. 3 | Ex. 4 | Com. Ex. 1 | Com. Ex. 2 | Com. Ex. 3 | Com. Ex. 4 |
|---|---|---|---|---|---|---|---|---|---|
| Cellulose | KC-W50GK (weight of the cellulose converted on the assumption that the percentage moisture of the cellulose is 0%) | 100 | 100 | 100 | 100 | 100 | 100 | 100 | 100 |
| Compound having a reactive double-bond group and a hydroxyl value of 200 KOHmg/g or more | HEMA (hydroxyl value of 431 KOHmg/g) | 66.7 | 233.3 | 66.7 | | 33.3 | 300 | 66.7 | 66.7 |
| | Glyceryl dimethacrylate (hydroxyl value of 246 KOHmg/g) | | | | 42.9 | | | | |
| Moisture content in the system (including the moisture originally contained in cellulose) | | 4.2 | 5.5 | 25 | 4.8 | 5.4 | 5.0 | 3.0 | 30 |
| | | Good | Good | Good | Good | Acceptable | Poor | Poor | Poor |

Example 5

Cellulose Refining Method 300 g of the urethane methacrylate resin composition 1 synthesized in Synthesis Example 1, 100 g of HEMA, and 0.2 g of tert-butyl catechol were mixed, and charged into a pressure kneader (DS1-5GHH-H manufactured by Moriyama Corporation). After adding 630 g of the cellulose powder product KC Flock® W-50GK (manufactured by Nippon Paper Industries Co., Ltd.) thereto, the mixture was kneaded under pressure at 60 rpm for 300 min. The cellulose refining process produced a cellulose nanofiber-containing resin composition 5. The cellulose used had a moisture content of 5.0 parts by mass with respect to 100 parts by mass of the amount of the cellulose converted on the assumption that the percentage moisture of the cellulose is 0%.

Example 6

Cellulose Refining Method 300 g of Aronix® M-350 manufactured by Toagosei Co. Ltd. (trimethylolpropane EO-modified triacrylate, or simply "EO-TMPTA"), 100 g of HEMA, and 0.2 g of tert-butyl catechol were mixed, and charged into a pressure kneader (DS1-5GHH-H manufactured by Moriyama Corporation). After adding 626 g of the cellulose powder product KC Flock® W-50GK (manufactured by Nippon Paper Industries Co., Ltd.) thereto, the mixture was kneaded under pressure at 60 rpm for 300 min. The cellulose refining process produced a cellulose nanofiber-containing resin composition 6. The cellulose had a moisture content of 4.3 parts by mass with respect to 100 parts by mass of the amount of the cellulose converted on the assumption that the percentage moisture of the cellulose is 0%. EO-TMPTA had a hydroxyl value of less than 1 KOHmg/g as measured by using the hydroxyl value measurement method described in Synthesis Example 1.

Example 7

Cellulose Refining Method 300 g of the urethane methacrylate resin composition 1 synthesized in Synthesis Example 1, 100 g of glyceryl dimethacrylate, and 0.2 g of tert-butyl catechol were mixed, and charged into a pressure kneader (DS1-5GHH-H manufactured by Moriyama Corporation). After adding 629 g of the cellulose powder product KC Flock® W-50GK (manufactured by Nippon Paper Industries Co., Ltd.) thereto, the mixture was kneaded under pressure at 60 rpm for 300 min. The cellulose refining process produced a cellulose nanofiber-containing resin composition 7. The cellulose used had a moisture content of 4.9 parts by mass with respect to 100 parts by mass of the amount of the cellulose converted on the assumption that the percentage moisture of the cellulose is 0%.

Example 8

Cellulose Refining Method 220 g of the urethane methacrylate resin composition 1 synthesized in Synthesis Example 1, 80 g of HEMA, and 0.2 g of tert-butyl catechol were mixed, and charged into a pressure kneader (DS1-5GHH-H manufactured by Moriyama Corporation). After adding 739 g of the cellulose powder product KC Flock® W-50GK (manufactured by Nippon Paper Industries Co., Ltd.) thereto, the mixture was kneaded under pressure at 60 rpm for 300 min. The cellulose refining process produced a cellulose nanofiber-containing resin composition 8. The cellulose used had a moisture content of 5.5 parts by mass with respect to 100 parts by mass of the amount of the cellulose converted on the assumption that the percentage moisture of the cellulose is 0%.

Example 9

Cellulose Refining Method 600 g of the urethane methacrylate resin composition 1 synthesized in Synthesis Example 1, 100 g of HEMA, and 0.2 g of tert-butyl catechol were mixed, and charged into a pressure kneader (DS1-5GHH-H manufactured by Moriyama Corporation). After adding 316 g of the cellulose powder product KC Flock® W-50GK (manufactured by Nippon Paper Industries Co., Ltd.) thereto, the mixture was kneaded under pressure at 60 rpm for 300 min. The cellulose refining process produced a cellulose nanofiber-containing resin composition 9. The cellulose used had a moisture content of 5.4 parts by mass with respect to 100 parts by mass of the amount of the cellulose converted on the assumption that the percentage moisture of the cellulose is 0%.

Example 10

Cellulose Refining Method 300 g of the urethane methacrylate resin composition 1 synthesized in Synthesis Example 1, 100 g of HEMA, and 0.2 g of tert-butyl catechol were mixed, and charged into a pressure kneader (DS1-5GHH-H manufactured by Moriyama Corporation). The kneader was then charged with 630 g of the cellulose powder product KC Flock® W-50GK (manufactured by Nippon Paper Industries Co., Ltd.). The cellulose used had a moisture content of 5.0 parts by mass with respect to 100 parts by mass of the amount of the cellulose converted on the assumption that the percentage moisture of the cellulose is 0%. After adding 120 g of water to make the moisture content 25.0 parts by mass with respect to 100 parts by mass of the amount of the cellulose converted on the assumption that the percentage moisture of the cellulose is 0%, the mixture was kneaded under pressure at 60 rpm for 60 min. Here, the sample was powdery with moisture. The sample was further kneaded under pressure at 60 rpm for 240 min. The cellulose refining process produced a cellulose nanofiber-containing resin composition 10.

Comparative Example 5

Cellulose Refining Method 400 g of the urethane methacrylate resin composition 1 synthesized in Synthesis Example 1, and 0.2 g of tert-butyl catechol were mixed, and charged into a pressure kneader (DS1-5GHH-H manufactured by Moriyama Corporation). After adding 629 g of the cellulose powder product KC Flock® W-50GK (manufactured by Nippon Paper Industries Co., Ltd.) thereto, the mixture was kneaded under pressure at 60 rpm for 300 min, thereby completing the cellulose refining process. The cellulose used had a moisture content of 4.8 parts by mass with respect to 100 parts by mass of the amount of the cellulose converted on the assumption that the percentage moisture of the cellulose is 0%.

Comparative Example 6

Cellulose Refining Method 400 g of EO-TMPTA, and 0.2 g of tert-butyl catechol were mixed, and charged into a pressure kneader (DS1-5GHH-H manufactured by Moriyama Corporation). After adding 631 g of the cellulose powder product KC Flock® W-50GK (manufactured by Nippon Paper Industries Co., Ltd.) thereto, the mixture was kneaded under pressure at 60 rpm for 300 min, thereby completing the cellulose refining process. The cellulose used had a moisture content of 5.1 parts by mass with respect to 100 parts by mass of the amount of the cellulose converted on the assumption that the percentage moisture of the cellulose is 0%.

Comparative Example 7

Cellulose Refining Method

The cellulose powder product KC Flock® W-50GK (manufactured by Nippon Paper Industries Co., Ltd.) was dried overnight with a 130° C. drier. The cellulose had a moisture content of 3.1 parts by mass with respect to 100 parts by mass of the amount of the cellulose converted on the assumption that the percentage moisture of the cellulose is 0%. 300 g of the urethane methacrylate resin composition 1 synthesized in Synthesis Example 1, 100 g of HEMA, and 0.2 g of tert-butyl catechol were mixed, and charged into a pressure kneader (DS1-5GHH-H manufactured by Moriyama Corporation). After adding 619 g of the dried KC Flock® W-50GK thereto, the mixture was kneaded under pressure at 60 rpm for 300 min, thereby completing the cellulose refining process.

Comparative Example 8

Cellulose Refining Method 300 g of the urethane methacrylate resin composition 1 synthesized in Synthesis Example 1, 100 g of HEMA, and 0.2 g of tert-butyl catechol were mixed, and charged into a pressure kneader (DS1-5GHH-H manufactured by Moriyama Corporation). The kneader was then charged with 633 g of the cellulose powder product KC Flock® W-50GK (manufactured by Nippon Paper Industries Co., Ltd.). The cellulose used had a moisture content of 5.5 parts by mass with respect to 100 parts by mass of the amount of the cellulose converted on the assumption that the percentage moisture of the cellulose is 0%. After adding 147 g of water to make the moisture content 30.0 parts by mass with respect to 100 parts by mass of the amount of the cellulose converted on the assumption that the percentage moisture of the cellulose is 0%, the mixture was kneaded under pressure at 60 rpm for 300 min.

Table 2 shows the results of the determination of refined state for the cellulose samples of Examples 5 to 10 and Comparative Examples 5 to 8.

TABLE 2

|  |  | Ex. 5 | Ex. 6 | Ex. 7 | Ex. 8 | Ex. 9 | Ex. 10 |
|---|---|---|---|---|---|---|---|
| Cellulose | KC-W50GK (weight of the cellulose converted on the assumption that the percentage moisture of the cellulose is 0%) | 100 | 100 | 100 | 100 | 100 | 100 |
| Compound having a reactive double bond group and a hydroxyl value of 200 KOHmg/g or more | HEMA (hydroxyl value of 431 KOHmg/g) | 16.7 | 16.7 |  | 11.4 | 33.3 | 16.7 |
|  | Glyceryl dimethacrylate (hydroxyl value of 246 KOHmg/g) |  |  | 16.7 |  |  |  |
| Compound having a reactive double bond group and a hydroxyl value of | Urethane methacrylate resin 1 of Synthesis Example 1 (hydroxyl value of less than 1 KOHmg/g) | 50.0 |  | 50.0 | 31.4 | 200 | 50.0 |

TABLE 2-continued

| 10 KOHmg/g or less | EO-TMPTA (hydroxyl value of less than 1 KOHmg/g) | | 50.0 | | | | |
|---|---|---|---|---|---|---|---|
| | Total | 66.7 | 66.7 | 66.7 | 42.8 | 233.3 | 66.7 |
| | Moisture content in the system (including the moisture originally contained in cellulose) | 5.0 | 4.3 | 4.9 | 5.5 | 5.4 | 25 |
| | Refined state of cellulose | Good | Good | Good | Good | Good | Good |

| | | Com. Ex. 5 | Com. Ex. 6 | Com. Ex. 7 | Com. Ex. 8 |
|---|---|---|---|---|---|
| Cellulose | KC-W50GK (weight of the cellulose converted on the assumption that the percentage moisture of the cellulose is 0%) | 100 | 100 | 100 | 100 |
| Compound having a reactive double bond group and a hydroxyl value of 200 KOHmg/g or more | HEMA (hydroxyl value of 431 KOHmg/g) | | | 16.7 | 16.7 |
| | Glyceryl dimethacrylate (hydroxyl value of 246 KOHmg/g) | | | | |
| Compound having a reactive double bond group and a hydroxyl value of 10 KOHmg/g or less | Urethane methacrylate resin 1 of Synthesis Example 1 (hydroxyl value of less than 1 KOHmg/g) | 66.7 | | 50.0 | 50.0 |
| | EO-TMPTA (hydroxyl value of less than 1 KOHmg/g) | | 66.7 | | |
| | Total | 66.7 | 66.7 | 66.7 | 66.7 |
| | Moisture content in the system (including the moisture originally contained in cellulose) | 4.8 | 5.1 | 3.1 | 30 |
| | Refined state of cellulose | Poor | Poor | Acceptable | Acceptable |

Example 11

Molded Body Producing Method 1

The cellulose nanofiber-containing resin composition 5 obtained in Example 5 was measured for moisture content. The moisture content was 4.5 parts by mass with respect to 100 parts by mass of the amount of the cellulose converted on the assumption that the percentage moisture of the cellulose is 0%. 8.56 g of the cellulose nanofiber-containing resin composition 1 and 100.00 g of Diovar® HTP-460 (methacrylic resin manufactured by DIC Corporation) were mixed, and dispersed at 1,000 rpm for 5 min using a TK Auto Homodisper (manufactured by Tokushu Kikai Kogyo Co., Ltd.). After adding and mixing 0.5 parts of 6% cobalt naphthenate, 1 part of a promoter RP-191 (manufactured by DHM), and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

[Percentage Moisture Measurement of Cellulose Nanofiber-Containing Resin Composition]

About 5 g of the cellulose nanofiber-containing resin composition was measured at 110° C. with the Infrared Moisture Meter FD-720 (manufactured by Kett Electric Laboratory) under the conditions of an automatic shutoff mode.

The same measurement was performed in Examples 12 and 13.

Example 12

Molded Body Producing Method 2

The cellulose nanofiber-containing resin composition 10 obtained in Example 10 was measured for moisture content. The moisture content was 22.4 parts by mass with respect to 100 parts by mass of the amount of the cellulose nanofiber converted on the assumption that the percentage moisture of the cellulose nanofiber is 0%. The cellulose nanofiber-containing resin composition 10 was dried overnight with a 50° C. drier. The dried cellulose nanofiber-containing resin composition 10 was measured for moisture content. The moisture content was 6.7 parts by mass with respect to 100 parts by mass of the amount of the cellulose nanofiber converted on the assumption that the percentage moisture of the cellulose nanofiber is 0%. 8.67 g of the dried cellulose nanofiber-containing resin composition 10, and 100.00 g of Diovar® HTP-460 were mixed, and dispersed at 1,000 rpm for 5 min using a TK Auto Homodisper (manufactured by Tokushu Kikai Kogyo Co., Ltd.). After adding and mixing 0.5 parts of 6% cobalt naphthenate, 1 part of a promoter RP-191 (manufactured by DHM), and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

Example 13

Molded Body Producing Method 3

The cellulose nanofiber-containing resin composition 6 obtained in Example 6 was measured for moisture content. The moisture content was 4.8 parts by mass with respect to 100 parts by mass of the amount of the cellulose converted on the assumption that the percentage moisture of the cellulose is 0%. 8.57 g of the cellulose nanofiber-containing resin composition 6, and 100.00 g of Diovar® HTP-460 were mixed, and dispersed at 1,000 rpm for 5 min using a TK Auto Homodisper (manufactured by Tokushu Kikai Kogyo Co., Ltd.). After adding and mixing 0.5 parts of 6% cobalt naphthenate, 1 part of a promoter RP-191, and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

Comparative Example 9

0.5 Parts of 6% Cobalt naphthenate, 1 part of a promoter RP-191, and 2 parts of 50% BPO were added, and mixed with 100.00 g of Diovar HTP-460. After being degassed with a vacuum desiccator, the mixture was poured into a mold, and heated at 80° C. for 6 h to obtain a 3 mm-thick molded plate. From the molded plate, a JIS K 6251 dumbbell-shaped test piece for tensile testing was prepared.

Comparative Example 10

100.00 g of Diovar HTP-460, 2.5 g of the PPG urethane methacrylate produced in Synthesis Example 1, and 0.83 g of HEMA were mixed, and dispersed at 1,000 rpm for 5 min with a TK Auto Homodisper (manufactured by Tokushu Kikai Kogyo Co., Ltd.). After adding 0.5 parts of 6% cobalt naphthenate, 1 part of a promoter RP-191, and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

Comparative Example 11

100.00 g of Diovar HTP-460, 2.5 g of EO-TMPTA, and 0.83 g of HEMA were mixed, and dispersed at 1,000 rpm for 5 min with a TK Auto Homodisper (manufactured by Tokushu Kikai Kogyo Co., Ltd.). After adding 0.5 parts of 6% cobalt naphthenate, 1 part of a promoter RP-191, and 2 parts of 50% BPO, the mixture was degassed with a vacuum desiccator. The mixture was then poured into a mold, and heated at 80° C. for 6 h to obtain a 3 mm-thick molded plate. From the molded plate, a JIS K 6251 dumbbell-shaped test piece for tensile testing was prepared.

[Method of Tensile Testing]

A tensile test was performed at a rate of 50 mm/min according to JIS K 6251.

Table 3 shows the results for the dumbbell-shaped test pieces for tensile testing of Examples 11 to 13 and Comparative Examples 9 to 11.

TABLE 3

|  |  | EX. 11 | EX. 12 | EX. 13 | Com. Ex. 9 | Com. Ex. 10 | Com. Ex. 11 |
|---|---|---|---|---|---|---|---|
|  | Diluent | HTP-460 | HTP-460 | HTP-460 | HTP-460 | HTP-460 | HTP-460 |
|  | Cellulose nanofiber-containing composition (C) | EX. 5 | EX. 10 | EX. 6 |  |  |  |
| Proportions | HTP-460 | 100 | 100 | 100 | 100 | 100 | 100 |
|  | Cellulose nanofiber | 5 | 5 | 5 |  |  |  |
|  | Urethane methacrylate resin 1 of Synthesis Example 1 | 2.5 | 2.5 |  |  | 2.5 |  |
|  | EO-TMPTA |  |  | 2.5 |  |  | 2.5 |
|  | HEMA | 0.83 | 0.83 | 0.83 |  | 0.83 | 0.83 |
|  | 6% Cobalt naphthenate | 0.5 | 0.5 | 0.5 | 0.5 | 0.5 | 0.5 |
|  | PR-191 | 1 | 1 | 1 | 1 | 1 | 1 |
|  | 50% BPO | 2 | 2 | 2 | 2 | 2 | 2 |
|  | Tensile strength (Mpa) | 9.5 | 9.4 | 16.0 | 7.9 | 8.0 | 14.4 |
|  | Tensile elongation (%) | 116 | 118 | 34 | 91 | 90 | 27 |

INDUSTRIAL APPLICABILITY

The present invention enables refining cellulose in the presence of a compound having a reactive double-bond group and a hydroxyl value of 200 KOHmg/g or more, instead of in water or organic solvent. The present invention enables refining cellulose in the presence of a compound having a reactive double-bond group and a hydroxyl value of 200 KOHmg/g or more, and a compound having a reactive double bond and a hydroxyl value of 10 KOHmg/g or less. A cellulose nanofiber-containing resin composition obtained by using such a method can be used to obtain a molded product that excels in mechanical strength. This makes the present invention highly useful in industry.

The invention claimed is:

1. A method for producing a cellulose nanofiber-containing resin composition, comprising:
    refining cellulose in the presence of a compound having a reactive double bond and a hydroxyl value of 200 KOHmg/g or more,
    wherein the cellulose has a moisture content of 4 to 25 parts by mass with respect to 100 parts by mass of the amount of the cellulose converted on the assumption that the percentage moisture of the cellulose is 0%.

2. The method for producing a cellulose nanofiber-containing resin composition according to claim 1,
    wherein the compound having a reactive double-bond group and a hydroxyl value of 200 KOHmg/g or more is 40 parts by mass to 250 parts by mass with respect to 100 parts by mass of the amount of the cellulose converted on the assumption that the percentage moisture of the cellulose is 0%.

3. The method for producing a cellulose nanofiber-containing resin composition according to claim 1, comprising:
    refining cellulose, further in the presence of a compound having a reactive double bond and a hydroxyl value of 10 KOHmg/g or less, to thereby produce a cellulose nanofiber-containing composition.

4. The method for producing a cellulose nanofiber-containing resin composition according to claim 3,
    wherein the amount of the compound having a reactive double-bond group and a hydroxyl value of 200 KOHmg/g or more is 10 parts by mass or more with respect to 100 parts by mass of the amount of the cellulose converted on the assumption that the percentage moisture of the cellulose is 0%, and
    the total amount of the compound having a reactive double-bond group and a hydroxyl value of 200 KOHmg/g or more, and the compound having a reactive double bond and a hydroxyl value of 10 KOHmg/g or less is 40 parts by mass to 250 parts by mass with respect to 100 parts by mass of the amount of the cellulose converted on the assumption that the percentage moisture of the cellulose is 0%.

5. The method for producing a cellulose nanofiber-containing resin composition according to claim 1, further comprising:
    diluting the cellulose nanofiber-containing resin composition with a compound having a reactive double-bond group.

6. The method for producing a cellulose nanofiber-containing resin composition according to claim 5, further comprising:
    incorporating a polymerization initiator.

7. A molded body produced by molding the cellulose nanofiber-containing resin composition obtained according to the method of claim 6.

8. The method for producing a cellulose nanofiber-containing resin composition according to claim 2, further comprising:
    diluting the cellulose nanofiber-containing resin composition with a compound having a reactive double-bond group.

9. The method for producing a cellulose nanofiber-containing resin composition according to claim 3, further comprising:
    diluting the cellulose nanofiber-containing resin composition with a compound having a reactive double-bond group.

10. The method for producing a cellulose nanofiber-containing resin composition according to claim 4, further comprising:
    diluting the cellulose nanofiber-containing resin composition with a compound having a reactive double-bond group.

11. The method for producing a cellulose nanofiber-containing resin composition according to claim 8, further comprising:
    incorporating a polymerization initiator.

12. The method for producing a cellulose nanofiber-containing resin composition according to claim 9, further comprising:
    incorporating a polymerization initiator.

13. The method for producing a cellulose nanofiber-containing resin composition according to claim 10, further comprising:
    incorporating a polymerization initiator.

14. A molded body produced by molding the cellulose nanofiber-containing resin composition obtained according to the method of claim 11.

15. A molded body produced by molding the cellulose nanofiber-containing resin composition obtained according to the method of claim 12.

16. A molded body produced by molding the cellulose nanofiber-containing resin composition obtained according to the method of claim 13.

* * * * *